United States Patent
Feng et al.

(10) Patent No.: US 10,227,101 B2
(45) Date of Patent: Mar. 12, 2019

(54) PNEUMATIC AND HYDRAULIC ELEVATING SEAT TUBE ASSEMBLY OF BICYCLE

(71) Applicant: J. D COMPONENTS CO., LTD., Shou Shui Hsiang, Chang Hua Hsien (TW)

(72) Inventors: Pin-Chieh Feng, Chang Hua Hsien (TW); Wen-Chia Kuo, Chang Hua Hsien (TW)

(73) Assignee: J.D Components Co., Ltd., Chang Hua Hsien (TW)

( * ) Notice: Subject to any disclaimer, the term of this patent is extended or adjusted under 35 U.S.C. 154(b) by 226 days.

(21) Appl. No.: 15/418,030

(22) Filed: Jan. 27, 2017

(65) Prior Publication Data

US 2017/0197680 A1    Jul. 13, 2017

(30) Foreign Application Priority Data

Jan. 13, 2016  (TW) .............................. 105200457 A

(51) Int. Cl.
*F15B 15/26* (2006.01)
*B62J 1/08* (2006.01)

(52) U.S. Cl.
CPC ........... *B62J 1/08* (2013.01); *B60Y 2400/406* (2013.01); *B60Y 2400/408* (2013.01); *B62J 2001/085* (2013.01)

(58) Field of Classification Search
CPC . B62J 1/08; B62J 2001/085; B60Y 2400/406; B60Y 2400/408; F15B 11/0725; F15B 11/076
See application file for complete search history.

(56) References Cited

U.S. PATENT DOCUMENTS

| | | | | |
|---|---|---|---|---|
| 4,245,826 A | * | 1/1981 | Wirges | A47C 3/30 267/121 |
| 5,154,264 A | * | 10/1992 | Poertzgen | A47C 3/30 267/64.22 |
| 7,134,379 B2 | * | 11/2006 | Jeon | A47C 3/30 91/437 |
| 8,424,657 B2 | * | 4/2013 | Hsu | F16F 9/368 267/124 |
| 9,126,647 B2 | * | 9/2015 | Kuo | B62J 1/08 |
| 9,567,027 B2 | * | 2/2017 | Kuo | B62J 1/08 |

FOREIGN PATENT DOCUMENTS

TW          M406117         6/2011

* cited by examiner

*Primary Examiner* — Michael Leslie
(74) *Attorney, Agent, or Firm* — Muncy, Geissler, Olds & Lowe, P.C.

(57) ABSTRACT

A pneumatic and hydraulic elevating seat tube assembly of a bicycle includes an outer tube and a movable inner tube in the outer tube. An elevating adjustment unit in the movable inner tube has a fixed inner tube in the movable inner tube, a fixed piston in the fixed inner tube, a floating piston in the fixed inner tube, and an elastic isolator in the floating piston which is between a bottom end of the movable inner tube and the fixed piston so that a gas chamber is formed between the floating piston and the movable inner tube and a lower oil chamber is formed between the floating piston and the fixed piston. The elastic isolator has first and second annular grooves facing toward the lower oil chamber and the gas chamber respectively. The elastic isolator under pressure is extended radially, thereby effective in isolating oil from gas positively.

10 Claims, 8 Drawing Sheets

PNEUMATIC AND HYDRAULIC ELEVATING SEAT TUBE ASSEMBLY OF BICYCLE

BACKGROUND OF THE INVENTION

1. Field of the Invention

The present invention relates generally to bicycles and more particularly, to a pneumatic and hydraulic elevating seat tube assembly of a bicycle.

2. Description of the Related Art

The conventional pneumatic and hydraulic elevating seat is worked by means of the compressibility of gas and the flowing of hydraulic oil in a space, which changes the relative position between an outer tube and a seat post, so that the height of the seat is adjustable.

In the related prior art, such as Taiwan Patent No. M406117, a main body of a piston is provided respectively on internal and external surfaces thereof with two annular grooves which are opened in opposite directions and overlap each other, and two sealing members are disposed in the two annular grooves respectively, so that the gas and the hydraulic oil are isolated from each other by the two sealing members staggered with each other. However, in the above-mentioned patent, because the two sealing members should be arranged at the inside and the outside of the piston, the main body of the piston has a disadvantage of having a too large external radius. For matching the external radius of the main body of the piston, the size of the outer tube is difficultly reduced and therefore may be affect the spatial arrangement of other elements.

SUMMARY OF THE INVENTION

It is an objective of the present invention to provide a pneumatic and hydraulic elevating seat tube assembly of a bicycle, which can isolate the oil and the gas therein well without increase of the radius of the tube.

To attain the above objective, the present invention provides a pneumatic and hydraulic elevating seat tube assembly which includes an outer tube, a movable inner tube, and an elevating adjustment unit. The movable inner tube is disposed in and axially movable relative to the outer tube. The elevating adjustment unit has a fixed inner tube, a fixed piston, a piston pin, an actuating shaft, a floating piston and an elastic isolator, wherein the fixed inner tube is disposed in the movable inner tube; the fixed piston is disposed in the fixed inner tube; an upper oil chamber is formed between the fixed piston and a top end of the fixed inner tube; the fixed piston has a pin hole communicating with the upper oil chamber; the piston pin is inserted in and axially movable relative to the pin hole of the fixed piston for opening and closing the pin hole; an end of the actuating shaft is disposed in and axially movable relative to the outer tube; the other end of the actuating shaft is inserted through a bottom end of the movable inner tube and connected with the piston pin for actuating the piston pin to move; the floating piston is disposed in the fixed inner tube, sleeved onto and axially movable relative to the actuating shaft and located between the bottom end of the movable inner tube and the fixed piston, so that a gas chamber is formed between the floating piston and the bottom end of the movable inner tube and a lower oil chamber is formed between the floating piston and the fixed piston and communicates with the pin hole of the fixed piston; the elastic isolator is disposed in the floating piston and sleeved onto and axially movable relative to the actuating shaft; the elastic isolator is provided at an end thereof with a first annular groove facing toward the lower oil chamber; the elastic isolator is provided at another end thereof with a second annular groove facing toward the gas chamber.

From the above-mentioned structure, it can be appreciated that in the process that the movable inner tube is moved downwardly relative to the outer tube, the first annular groove of the elastic isolator receives a pressure from the hydraulic oil in the lower oil chamber so that the elastic isolator is extended radially to prevent the hydraulic oil from flowing into the gas chamber. On the other hand, in the process that the movable inner tube is moved upwardly relative to the outer tube, the second annular groove of the elastic isolator receives a pressure from the gas in the gas chamber so that the elastic isolator is extended radially to prevent the gas from flowing into the lower oil chamber. In other words, the pneumatic and hydraulic elevating seat tube assembly of the present invention can isolate the oil and the gas therein well by means of the radial and elastic deformation of the elastic isolator, thereby solving the problem of the prior art.

DETAILED DESCRIPTION OF THE INVENTION

Figure 1:
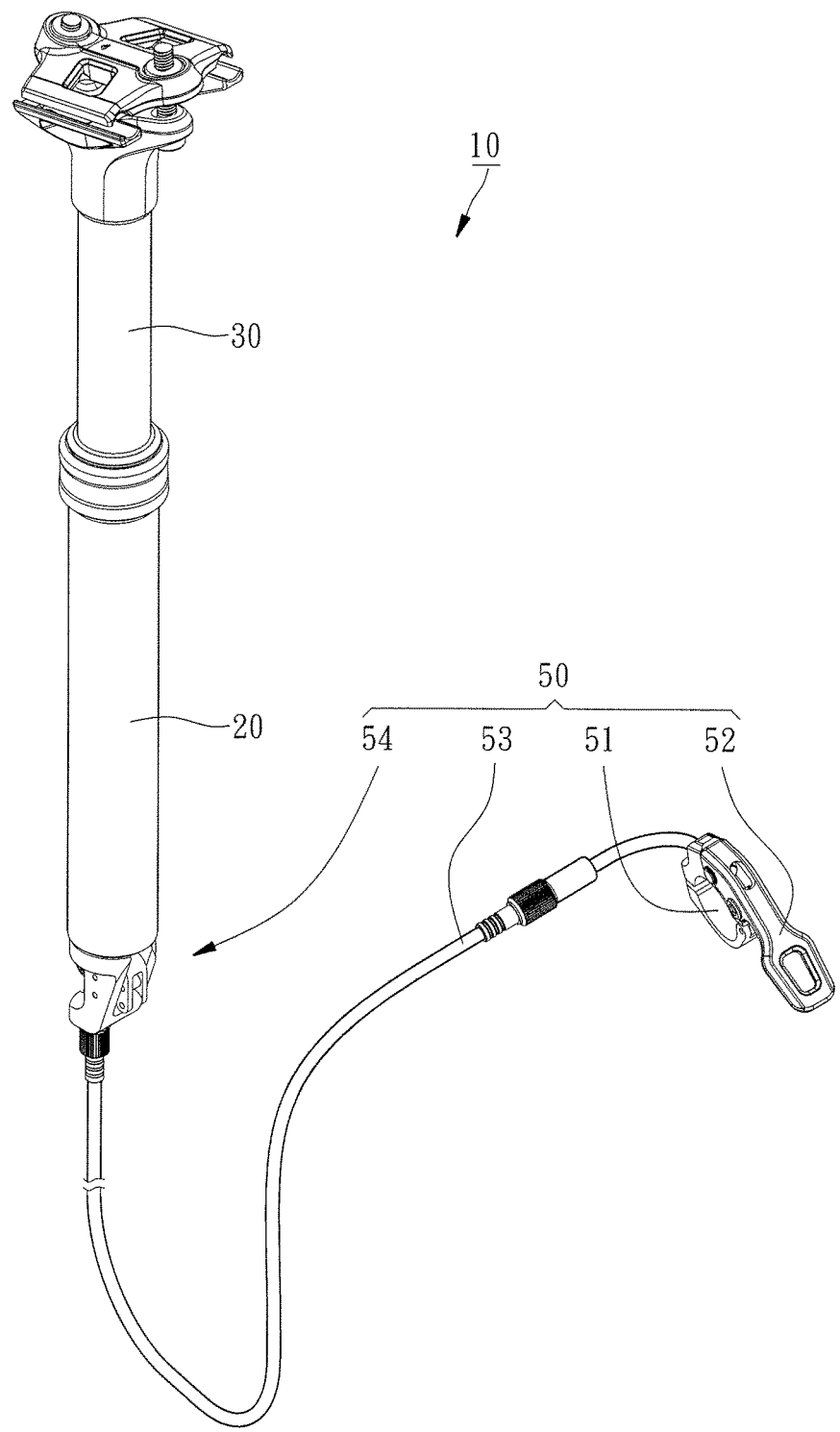
FIG. 1 is a perspective view showing the appearance of a first embodiment of the present invention.
Figure 2:
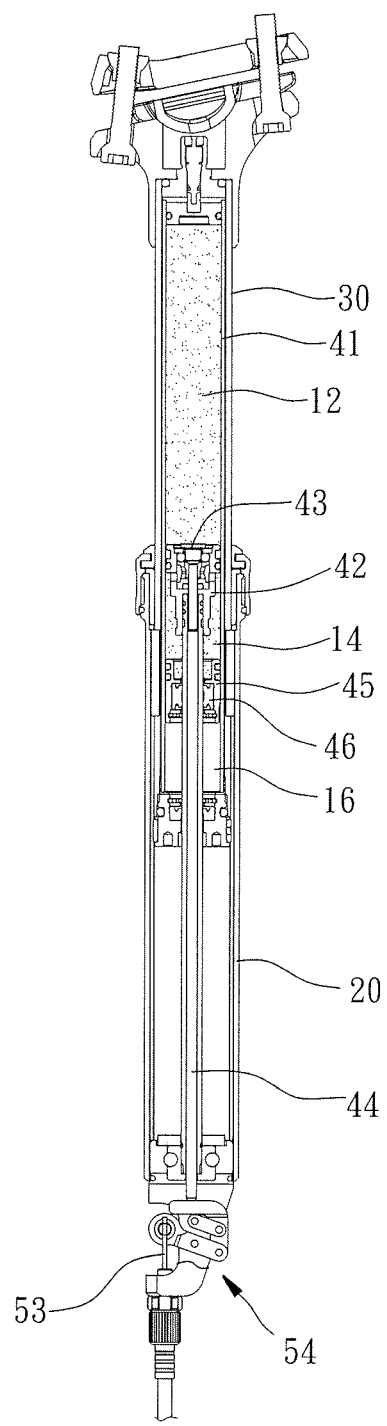
FIG. 2 is an assembled sectional view of the first embodiment of the present invention.
Figure 4:
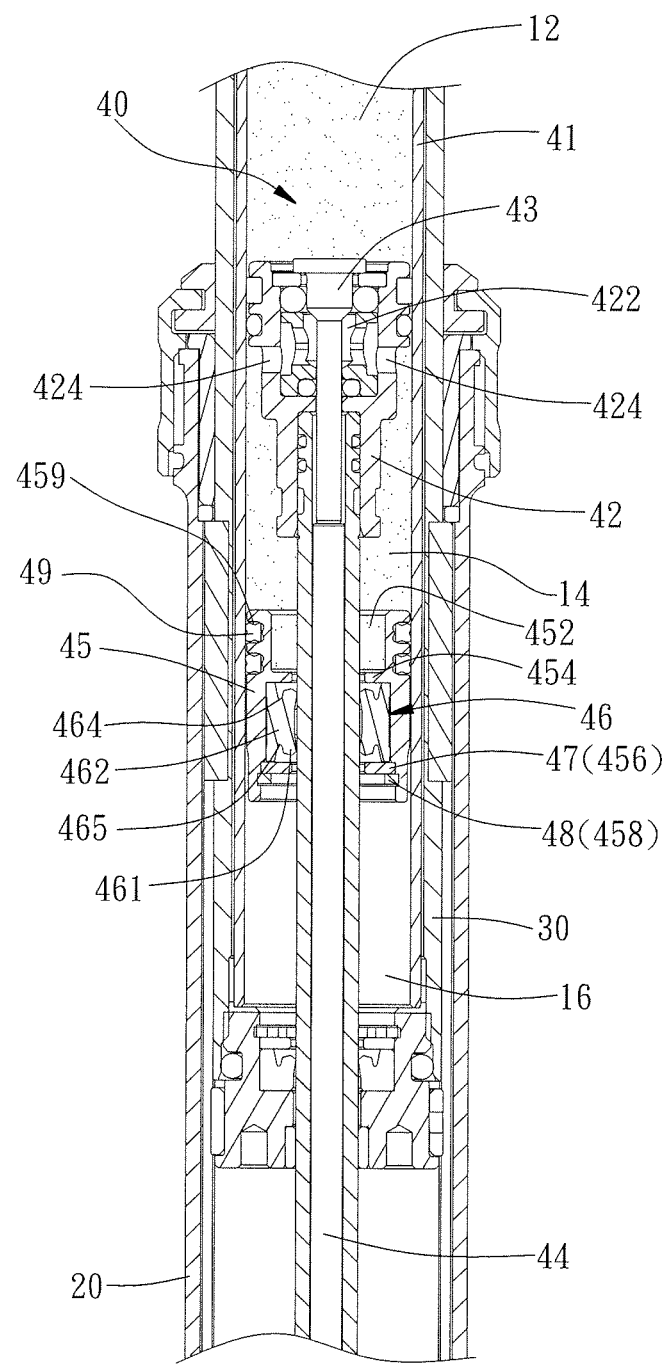
FIG. 4 is an enlarged view of a part of the first embodiment of the present invention.

Referring to FIGS. 1, 2 and 4, a pneumatic and hydraulic elevating seat tube assembly 10 of the present invention includes an outer tube 20, a movable inner tube 30, an elevating adjustment unit 40, and a control unit 50.

The bottom end of the outer tube 20 is adapted to be connected with a bicycle frame (not shown).

The top end of the movable inner tube 30 is adapted for the installation of a saddle (not shown). The bottom end of the movable inner tube 30 is inserted in the outer tube 20 through the top end of the outer tube 20, and the movable inner tube 30 is movable upwardly and downwardly in the axial direction of the outer tube 20.

Figure 3:
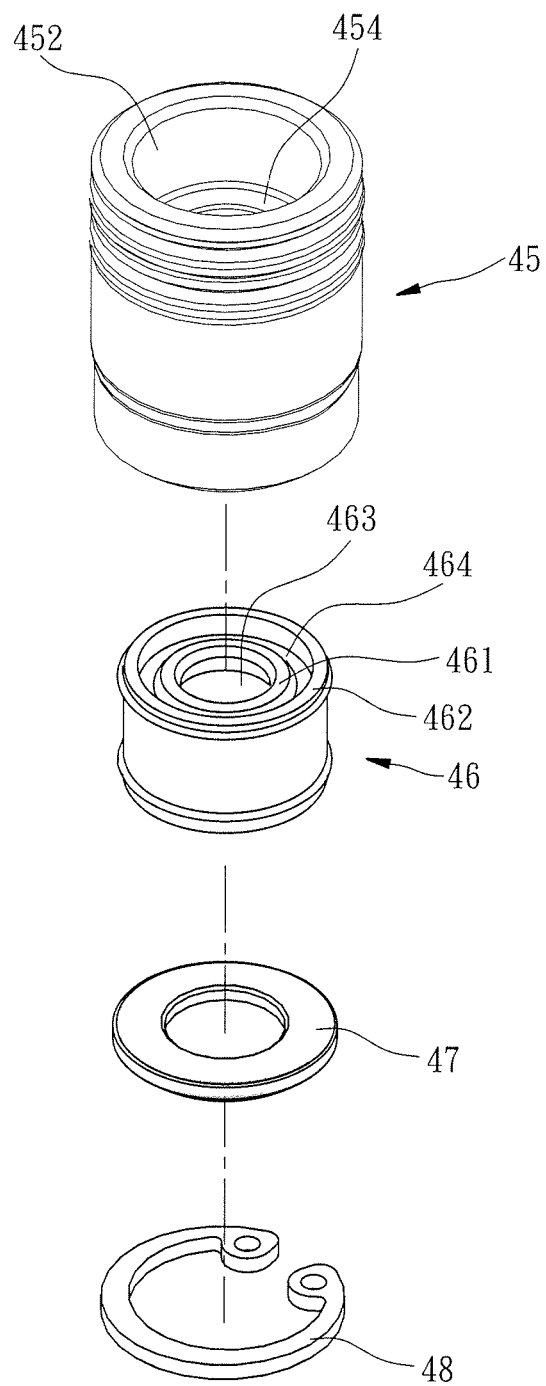
FIG. 3 is an exploded perspective view of a part of the first embodiment of the present invention.

Referring to FIGS. 2-4, the elevating adjustment unit 40 has a fixed inner tube 41, a fixed piston 42, a piston pin 43, an actuating shaft 44, a floating piston 45, an elastic isolator 46, and two external oil seals 49.

The fixed inner tube 41 is disposed in the movable inner tube 30 and movable upwardly or downwardly along with the movable inner tube 30.

The fixed piston 42 is fixed in the fixed inner tube 41. An upper oil chamber 12 is formed between the fixed piston 42 and the top end of the fixed inner tube 41. Besides, the fixed piston 42 has a pin hole 422, and four communicating holes 424 radially communicating with the pin hole 422. The pin hole 422 communicates with the upper oil chamber 12.

The piston pin 43 is inserted in the pin hole 422 of the fixed piston 42 for controlling the communicating relation between the upper oil chamber 12 and the pin hole 422.

The bottom end of the actuating shaft 44 is protruded out of the bottom end of the outer tube 20. The top end of the actuating shaft 44 is inserted through the bottom end of the movable inner tube 30 and connected with the piston pin 43 for pushing the piston pin 43 away from the pin hole 422 of the fixed piston 42.

The floating piston 45 is disposed in the fixed inner tube 41 and located between the fixed piston 42 and the bottom end of the fixed inner tube 41, so that a lower oil chamber 14 is formed between the floating piston 45 and the bottom end of the fixed piston 42 and a gas chamber 16 is formed between the floating piston 45 and the bottom end of the fixed inner tube 41. The lower oil chamber 14 communicates with the pin hole 422 of the fixed piston 42 through the communicating holes 424 of the fixed piston 42. Besides, the floating piston 45 is provided with an axial hole 452, an internal flange 454, a washer groove 456, and a retainer groove 458. The floating piston 45 is sleeved onto the actuating shaft 44 by the axial hole 452, and the axial hole 452 communicates with the lower oil chamber 14 and the gas chamber 16. The internal flange 454 is extended from the internal wall of the axial hole 452 toward the actuating shaft 44 and separated from the external surface of the actuating shaft 44 by a predetermined interval. The washer groove 456 is concaved from the internal wall of the axial hole 452 in a direction away from the actuating shaft 44 and located below the internal flange 454. The retainer groove 458 is concaved from the internal wall of the axial hole 452 in a direction away from the actuating shaft 44 and located below the washer groove 456. The floating piston 45 is provided on the external surface thereof with two external oil seal grooves 459 arranged side by side.

The elastic isolator 46 is disposed in the axial hole 452 of the floating piston 45 and has an internal annular wall 461 and an external annular wall 462. The internal annular wall 461 is provided with a matching hole 463 and sleeved onto the actuating shaft 44 by the matching hole 463 in a way that the internal surface of the internal annular wall 461 is abutted on the external surface of the actuating shaft 44. The internal surface of the external annular wall 462 is connected with the external surface of the internal annular wall 461. The external surface of the external annular wall 462 is abutted on the internal wall of the axial hole 452 of the floating piston 45. The top end of the external annular wall 462 is abutted on the bottom surface of the internal flange 454 of the floating piston 45. The bottom end of the external annular wall 462 is abutted on a washer 47 which is disposed in the washer groove 456 of the floating piston 45 and fixed by a retainer 48 disposed in the retainer groove 458 of the floating piston 45. Besides, the elastic isolator 46 has a first annular groove 464 and a second annular groove 465. The first annular groove 464 is located between the top end of the internal annular wall 461 and the top end of the external annular wall 462 and faces toward the lower oil chamber 14. The second annular groove 465 is located between the bottom end of the internal annular wall 461 and the bottom end of the external annular wall 462 and faces toward the gas chamber 16. The first and second annular grooves 464 and 465 are preferably, but unlimited to be, both V-shaped on the cross section as shown in FIG. 4.

The external oil seals 49 are disposed in the external oil seal grooves 459 of the floating piston 45 and abutted on the internal surface of the fixed inner tube 41 for sealing the clearance between the fixed inner tube 41 and the floating piston 45.

As shown in FIGS. 1-2, the control unit 50 has a clamp ring 51, a controlling handle 52, a rope 53, and a linking stem 54. The clamp ring 51 is adapted to be fixed to a bicycle handlebar (not shown). The controlling handle 52 is rotatably attached to the clamp ring 51. An end of the rope 53 is connected with the controlling handle 52. The linking stem 54 is rotatably attached to the bottom end of the outer tube 20, connected with the other end of the rope 53, and abutted against the bottom end of the actuating shaft 44.

Figure 5:
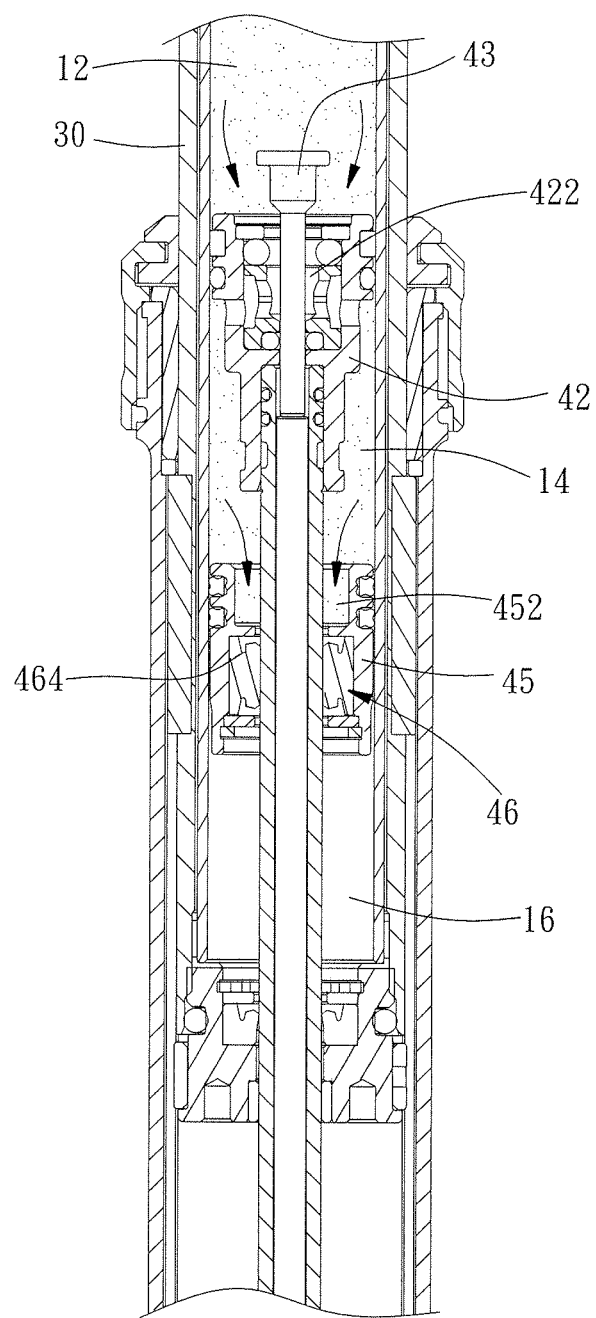
FIG. 5 is similar to FIG. 4, primarily showing that a first annular groove of an elastic isolator receives a pressure from hydraulic oil.
Figure 7:
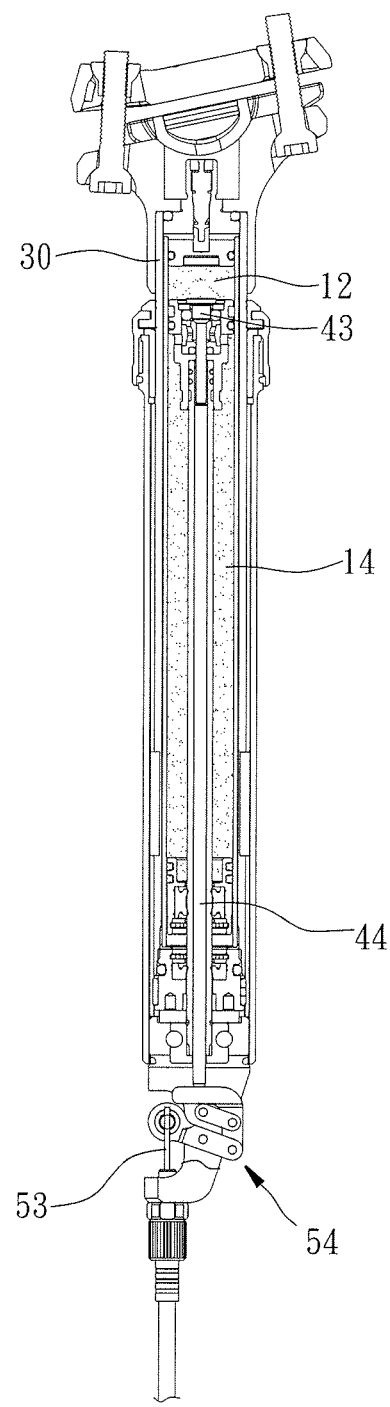
FIG. 7 is similar to FIG. 2, primarily showing the status after an inner tube is pressed into an outer tube downwardly.

When shortening the part of the movable inner tube 30 protruded out of the outer tube 20, the user firstly operates the controlling handle 52 to apply a pulling force to the rope 53 to make the rope 53 drive the linking stem 54 to push the bottom end of the actuating shaft 44. When the actuating shaft 44 is pushed, the piston pin 43 is moved to unclose the pin hole 422 of the fixed piston 42 to make the upper and lower oil chambers 12 and 14 communicate with each other. Then, the movable inner tube 30 can be pressed downwardly by the weight of the user. In the process that the movable inner tube 30 is pressed downwardly, the space in the upper oil chamber 12 is gradually reduced, so the hydraulic oil in the upper oil chamber 12 is forced to flow into the lower oil chamber 14 and the hydraulic oil in the lower oil chamber 14 is forced to flow into the axial hole 452 of the floating piston 45, so that the flowing hydraulic oil applies a downward pushing force to the first annular groove 464 of the elastic isolator 46. In such condition, as shown in FIG. 5, the flowing hydraulic oil drives the elastic isolator 46 to move the floating piston 45, so that the floating piston 45 and the elastic isolator 46 are moved downwardly together. In the process that the floating piston 45 is moved downwardly, the space in the gas chamber 16 is gradually reduced so that the gas in the gas chamber 16 is compressed. On the other hand, the flowing hydraulic oil also forces the elastic isolator 46 to be extended radially to prevent the hydraulic oil from flowing into the gas chamber 16. When the movable inner tube 30 achieves the required position, the user can operate the controlling handle 52 to relieve the pulling force applied to the rope 53, thereby relieving the pushing force applied by the linking stem 54 to the actuating shaft 44. Meanwhile, the piston pin 43 is forced by the pressure from the hydraulic oil to close the pin hole 422 of the fixed piston 42, as shown in FIGS. 4 and 7, to make the upper and lower oil chambers 12 and 14 not communicate with each other. At this time, the hydraulic oil and the gas both stop flowing, and the positioning of the movable inner tube 30 is accomplished.

Figure 6:
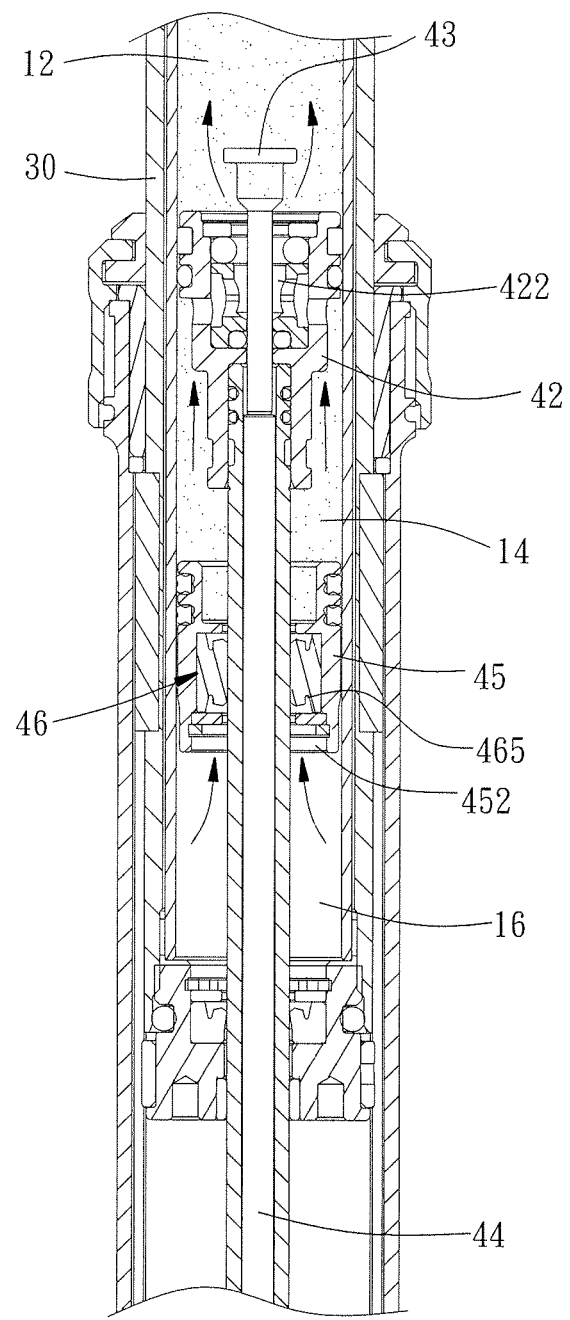
FIG. 6 is similar to FIG. 4, primarily showing that a second annular groove of the elastic isolator receives a pressure from gas.

When lengthening the part of the movable inner tube 30 protruded out of the outer tube 20, the user also firstly uses the linking relation between the controlling handle 52, the rope 53 and the linking stem 54 to make the actuating shaft 44 drive the piston pin 43 to move away from the pin hole 422 of the fixed piston 42 to make the upper and lower oil chambers 12 and 14 communicate with each other. At this time, as shown in FIG. 6, the pneumatic pressure in the gas chamber 16 forces the gas to flow into the axial hole 452 of the floating piston 45 to apply an upward pushing force to the second annular groove 465 of the elastic isolator 46. On one hand, the gas drives the elastic isolator 46 to move the floating piston 45, so that the floating piston 45 and the elastic isolator 46 are moved upwardly together. On the other hand, the gas forces the elastic isolator 46 to be extended radially to prevent the gas from flowing into the lower oil chamber 14. In the process that the floating piston 45 is moved upwardly, the space in the lower oil chamber 14 is gradually reduced along with the upward movement of the floating piston 45, so the hydraulic oil in the lower oil chamber 14 is forced to flow into the upper oil chamber 12 and the hydraulic oil in the upper oil chamber 12 pushes the top end of the fixed inner tube 41 to apply an upward pushing force to the movable inner tube 30, thereby causing the movable inner tube 30 start to move upwardly. Meanwhile, the space in the upper oil chamber 12 is gradually increased along with the upward movement of the movable inner tube 30. When the movable inner tube 30 achieves the required position, the user can use the linking relation between the controlling handle 52, the rope 53 and the linking stem 54 to relieve the pushing force applied to the actuating shaft 44. Then, the piston pin 43 is forced by the pressure from the hydraulic oil to move back into the pin hole 422 of the fixed piston 42 to make the upper and lower oil chambers 12 and 14 not communicate with each other, as shown in FIG. 2. At this time, the hydraulic oil and the gas both stop flowing, and the positioning of the movable inner tube 30 is accomplished.

Figure 8:
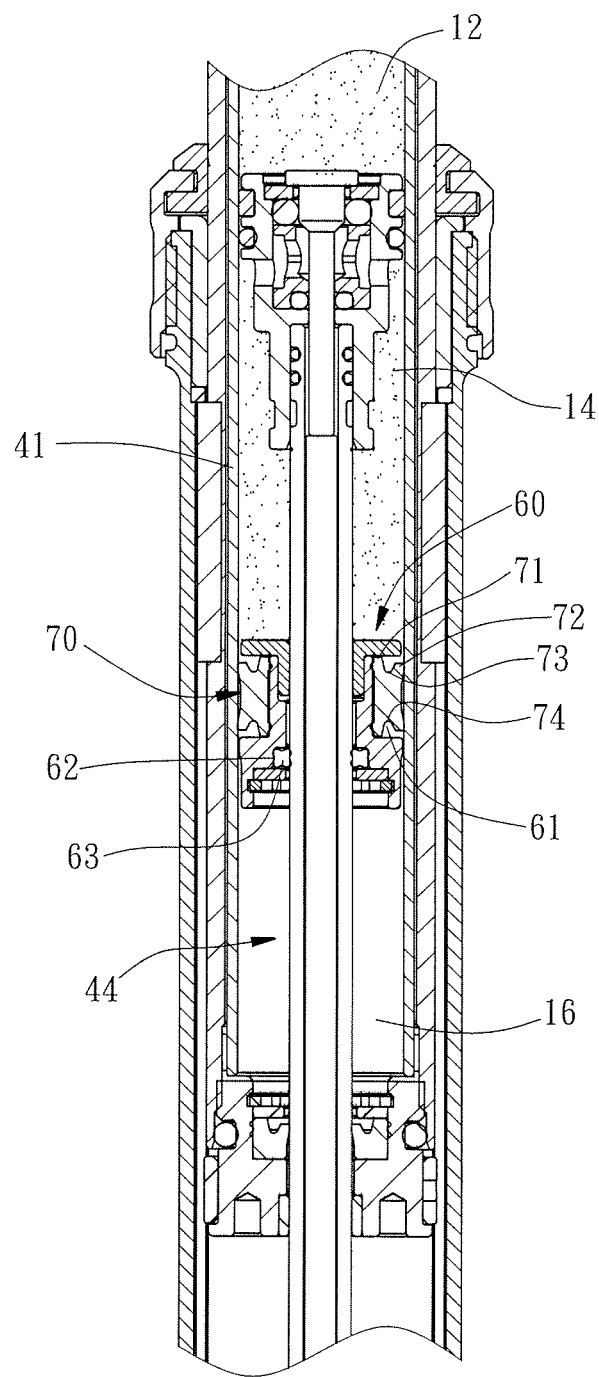
FIG. 8 is an assembled sectional view of a second embodiment of the present invention.

In another aspect, the elastic isolator can be disposed in different positions. In the second embodiment of the present invention as shown in FIG. 8, the external surface of the floating piston 60 is separated from the internal surface of the fixed inner tube 41 by a predetermined interval and provided with an accommodating groove 61. The floating piston 60 is provided on the internal surface thereof with an internal oil seal groove 62 wherein an internal oil seal 63 is disposed. The internal oil seal 63 is abutted on the external surface of the actuating shaft 44 for sealing the clearance between the actuating shaft 44 and the floating piston 60.

The elastic isolator 70 is disposed in the accommodating groove 61 of the floating piston 60 and has an internal annular wall 71 and an external annular wall 72. The internal surface of the internal annular wall 71 is elastically abutted on the internal wall of the accommodating groove 61 of the floating piston 60. The top and bottom ends of the internal annular wall 71 are respectively abutted on the top and bottom ends of the accommodating groove 61 of the floating piston 60. The internal surface of the external annular wall 72 is connected with the external surface of the internal annular wall 71. The external surface of the external annular wall 72 is elastically abutted on the internal surface of the fixed inner tube 41.

As a result, in the process that the movable inner tube 30 is pressed downwardly, the space in the upper oil chamber 12 is gradually reduced, so the hydraulic oil in the upper oil chamber 12 is forced to flow into the lower oil chamber 14 and the hydraulic oil in the lower oil chamber 14 is forced to flow into the gap between the fixed inner tube 41 and the floating piston 60, so that the flowing hydraulic oil applies a downward pushing force to the first annular groove 73 of the elastic isolator 70. In such condition, the elastic isolator 70 is extended radially to prevent the hydraulic oil from flowing into the gas chamber 16. On the other hand, in the process that the part of the movable inner tube 30 protruded out of the outer tube 20 is lengthened, the pneumatic pressure in the gas chamber 16 forces the gas to flow into the gap between the fixed inner tube 41 and the floating piston 60, so that the flowing gas applies an upward pushing force to the second annular groove 74 of the elastic isolator 70. At this time, the elastic isolator 70 is extended radially to prevent the gas from flowing into the lower oil chamber 14.

In conclusion, the pneumatic and hydraulic elevating seat tube assembly 10 of the present invention can isolate the oil and the gas therein well by means of the radial and elastic deformation of the elastic isolator 46 or 70 under pressure. Compared with the prior art, in the structure of the present invention the radius of the outer tube 20 or the movable inner tube 30 has no need to be increased, that provides more space for other elements, thereby achieving the objective of the present invention.

What is claimed is:

1. A pneumatic and hydraulic elevating seat tube assembly of a bicycle, the pneumatic and hydraulic elevating seat tube assembly comprising:
   an outer tube;
   a movable inner tube disposed in and axially movable relative to the outer tube; and
   an elevating adjustment unit having a fixed inner tube, a fixed piston, a piston pin, an actuating shaft, a floating piston and an elastic isolator, the fixed inner tube being disposed in the movable inner tube, the fixed piston being disposed in the fixed inner tube, an upper oil chamber being formed between the fixed piston and a top end of the fixed inner tube, the fixed piston having a pin hole communicating with the upper oil chamber, the piston pin being inserted in and axially movable relative to the pin hole of the fixed piston, the actuating shaft being disposed in and axially movable relative to the movable inner tube and the outer tube and connected with the piston pin, the floating piston being disposed in the fixed inner tube, sleeved onto and axially movable relative to the actuating shaft and located between a bottom end of the movable inner tube and the fixed piston, a gas chamber being formed between the floating piston and the bottom end of the movable inner tube, a lower oil chamber being formed between the floating piston and the fixed piston and communicating with the pin hole of the fixed piston, the elastic isolator being attached to the floating piston, the elastic isolator being provided at an end thereof with a first annular groove facing toward the lower oil chamber, the elastic isolator being provided at another end thereof with a second annular groove facing toward the gas chamber.

2. The pneumatic and hydraulic elevating seat tube assembly as claimed in claim 1, wherein the floating piston is provided with an axial hole and sleeved onto the actuating shaft by the axial hole; the elastic isolator is disposed in the axial hole of the floating piston and sleeved onto and axially movable relative to the actuating shaft.

3. The pneumatic and hydraulic elevating seat tube assembly as claimed in claim 2, wherein the floating piston has an internal flange and a washer groove; the internal flange is extended from an internal wall of the axial hole toward the actuating shaft and separated from an external surface of the actuating shaft by a predetermined interval; the washer groove is concaved from the internal wall of the axial hole in a direction away from the actuating shaft and located below the internal flange; a top end of the elastic isolator is abutted on a bottom surface of the internal flange; a bottom end of the elastic isolator is abutted on a washer disposed in the washer groove.

4. The pneumatic and hydraulic elevating seat tube assembly as claimed in claim 3, wherein the elastic isolator has an internal annular wall and an external annular wall; the internal annular wall is provided with a matching hole and sleeved onto the actuating shaft by the matching hole; an internal surface of the internal annular wall is elastically abutted on the external surface of the actuating shaft; an external surface of the internal annular wall is connected with an internal surface of the external annular wall; an external surface of the external annular wall is elastically abutted on the internal wall of the axial hole of the floating piston; a top end of the external annular wall is abutted on the bottom surface of the internal flange; a bottom end of the external annular wall is abutted on the washer; the first annular groove is located between a top end of the internal annular wall and the top end of the external annular wall; the second annular groove is located between a bottom end of the internal annular wall and the bottom end of the external annular wall.

5. The pneumatic and hydraulic elevating seat tube assembly as claimed in claim 1, wherein the floating piston is provided on an external surface thereof with an external oil seal groove; the elevating adjustment unit has an external oil seal disposed in the external oil seal groove of the floating piston and abutted on an internal surface of the fixed inner tube.

6. The pneumatic and hydraulic elevating seat tube assembly as claimed in claim 1, wherein the first annular groove and the second annular groove are both V-shaped on a cross section of the elastic isolator.

7. The pneumatic and hydraulic elevating seat tube assembly as claimed in claim 1, wherein an external surface of the floating piston is separated from an internal surface of the fixed inner tube by a predetermined interval and provided with an accommodating groove; the elastic isolator is disposed in the accommodating groove of the floating piston and abutted on the internal surface of the fixed inner tube.

8. The pneumatic and hydraulic elevating seat tube assembly as claimed in claim 7, wherein the elastic isolator has an internal annular wall and an external annular wall; an internal surface of the internal annular wall is elastically abutted on an internal wall of the accommodating groove of the floating piston; a top end and a bottom end of the internal annular wall are respectively abutted on a top end and a bottom end of the accommodating groove of the floating piston; an internal surface of the external annular wall is connected with an external surface of the internal annular wall; an external surface of the external annular wall is elastically abutted on the internal surface of the fixed inner tube; the first annular groove is located between the top end of the internal annular wall and a top end of the external annular wall; the second annular groove is located between the bottom end of the internal annular wall and a bottom end of the external annular wall.

9. The pneumatic and hydraulic elevating seat tube assembly as claimed in claim 7, wherein the floating piston is provided on an internal surface thereof with an internal oil seal groove; the elevating adjustment unit has an internal oil seal disposed in the internal oil seal groove of the floating piston and abutted on an external surface of the actuating shaft.

10. The pneumatic and hydraulic elevating seat tube assembly as claimed in claim 7, wherein the first annular groove and the second annular groove are both V-shaped on a cross section of the elastic isolator.

* * * * *